United States Patent [19]

Gordon

[11] 4,183,896
[45] Jan. 15, 1980

[54] ANTI-POLLUTION DEVICE FOR EXHAUST GASES

[76] Inventor: Donald C. Gordon, 2220 Phillips Dr., Northglenn, Colo. 80233

[21] Appl. No.: 925,218

[22] Filed: Jul. 17, 1978

Related U.S. Application Data

[63] Continuation-in-part of Ser. No. 880,085, Feb. 22, 1978, abandoned, which is a continuation of Ser. No. 696,774, Jun. 16, 1976, abandoned.

[51] Int. Cl.² .................. C01B 17/82; C01B 17/84
[52] U.S. Cl. ........................... 422/168; 422/174;
422/176; 422/177; 55/DIG. 30; 60/303
[58] Field of Search ............ 422/169, 174, 171, 176,
422/177, 180, 199, 201, 211, 220, 222, 168;
55/DIG. 30, 456, 446, 493, 481, 482; 181/270,
264, 279, 280; 60/303, 298; 138/37

[56] References Cited

U.S. PATENT DOCUMENTS

| 1,424,349 | 8/1922 | Fryett | 138/37 |
|---|---|---|---|
| 1,858,637 | 5/1932 | McDonald | 422/174 |
| 2,837,169 | 6/1958 | Sawyer | 55/261 |
| 3,408,167 | 10/1968 | Burden | 422/176 |
| 3,973,916 | 8/1976 | Shelton | 422/174 |
| 3,988,888 | 11/1976 | Jacobson | 422/198 |
| 4,052,166 | 10/1977 | Mita et al. | 422/177 |
| 4,054,424 | 10/1977 | Staudinger et al. | 422/207 |

*Primary Examiner*—Joseph Scovronek
*Assistant Examiner*—Chris Konkol
*Attorney, Agent, or Firm*—Ancel W. Lewis, Jr.

[57] ABSTRACT

An anti-pollution device includes a cylindrical chamber attached in line with the exhaust of an automotive vehicle, which in conjunction with the velocity and heat of emitted exhaust gases further heats and burns emitted gases exiting the tail pipe into relatively harmless non-polluted vapors. The chamber is affixed in line with the exhaust tail pipe of an automotive vehicle near the exhaust manifold and consists of a cylindrical outer and inner shell with insulation therebetween with a three stage system constructed internally along the length of the chamber for progressively heating and burning of exhausted gases and finally cooling thereof. In one form the first stage consists of a spiraled ceramic cone for accelerating and concentrating the exhaust fumes into the second stage consisting of a series of ceramic rings for burning of exhaust gases, the burned exhaust fumes then passing therefrom into the third stage consisting of a porcelain lined cooling pipe for cooling of exhaust gases prior to their emission out of an automotive vehicle. In another form there is a source of energy for heating the gases in a Venturi tube combustion section by igniting the gases, and there is further provided an arrangement for introducing controlled amounts of air in the combustion section to enhance combustion of the gases.

23 Claims, 15 Drawing Figures

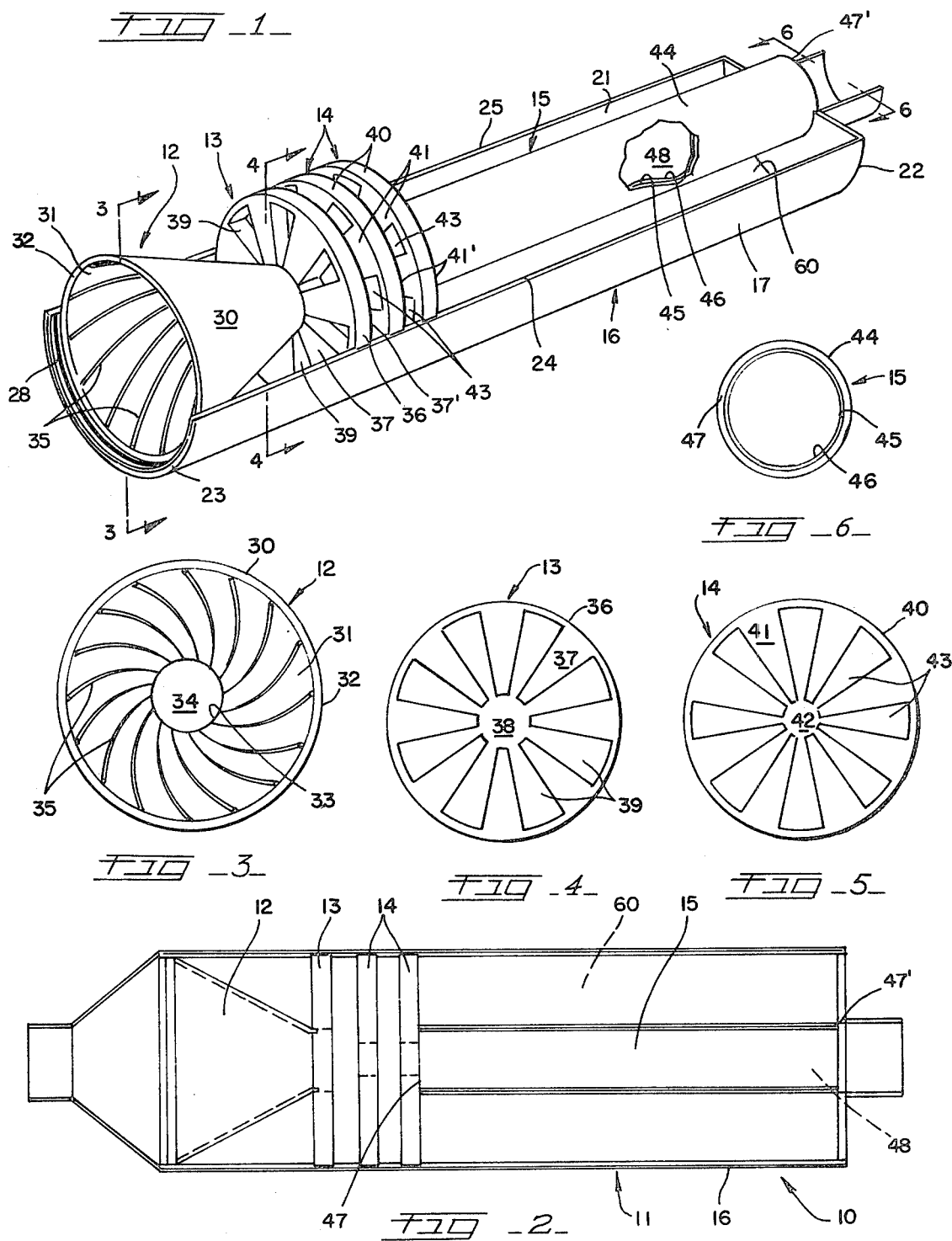

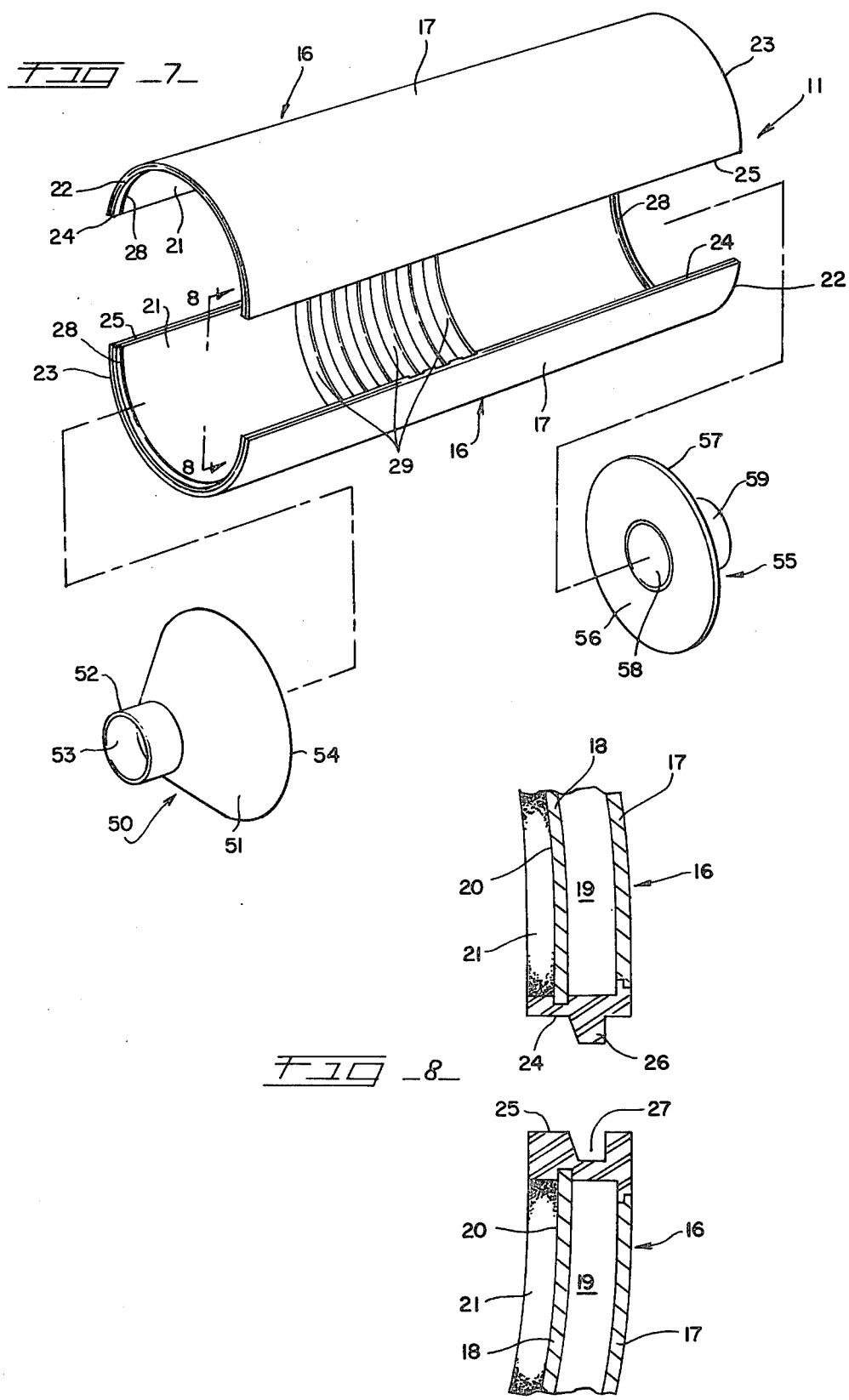

ANTI-POLLUTION DEVICE FOR EXHAUST GASES

This is a continuation-in-part of my co-pending application Ser. No. 880,085, filed Feb. 22, 1978, now abandoned, which was a continuation of my co-pending application Ser. No. 696,774, filed June 16, 1976, now abandoned.

FIELD OF THE INVENTION

This invention relates to an anti-pollution device for automotive vehicles which is adapted to be attached in line with the exhaust pipe of an automotive vehicle to burn emitted gases into relatively harmless non-polluted exhaust fumes.

BACKGROUND OF THE INVENTION

Pollution of our atmosphere is one of everybody's major concerns today. Ecologists have predicted, for example, that if we continue to pollute our atmosphere at the present rate, our citizens will have to wear gas masks, particularly in our major cities, by the turn of the next century. One of the major contributors to atmospheric pollution is the automotive vehicle. Many anti-pollution devices for automotive vehicles are available today, such as anti-pollution devices provided with late model automobiles wherein exhaust gases are rerouted through the automotive carburetor, but such systems are generally complex and costly to manufacture and do not adequately reduce the amount of pollutants exhausted into the atmosphere. Other described devices include the use of filtering through carbon particles or similar materials, filtering by means of oil or other liquid solutions, and the like, but such devices are also minimally effective in reducing the quantity of pollutants exhausted into the atmosphere. There is then an obvious need in the marketplace for an effective yet inexpensive method to eliminate or substantially reduce the volume of polutant materials exhausted into the atmosphere by automotive vehicles.

SUMMARY OF THE INVENTION

The present invention provides an anti-pollution device for automotive vehicles which burns emitted exhaust fumes to minimize the volume of pollutant materials exhausted into the atmosphere.

It is a feature of the present invention to provide an anti-pollution device for automotive vehicles.

A further feature of the present invention provides an anti-pollution device for automotive vehicles which is easy to install on an automobile and reliable and efficient in operation.

Yet still a further feature of the present invention provides an anti-pollution device for automotive vehicles which is of a rugged and durable construction and which, therefore, may be guaranteed by the manufacturer to withstand long and continual usage.

An additional feature of the present invention provides an anti-pollution device for automotive vehicles which is simple in construction and which, therefore, may be produced by a manufacturer at an economical cost to encourage widespread usage thereof.

Other objects, advantages and capabilities of the present invention will become more apparent as the description proceeds, taken in conjunction with the accompanying drawings in which like parts have similar reference numerals and in which:

FIG. 1 is a perspective cut-away of an anti-pollution device for automotive vehicles;

FIG. 2 is a side sectional view of the anti-pollution device;

FIG. 3 is a front view of the spiral cone comprising the first stage of the anti-pollution device;

FIG. 4 is a front view of the first porcelain ring comprising the second stage of the anti-pollution device;

FIG. 5 is a front view of subsequent porcelain rings comprising the second stage of the anti-pollution device;

FIG. 6 is an end view of the exhaust end of the anti-pollution device;

FIG. 7 is an exploded view of the cylindrical chamber showing the front and rear automotive tail pipe connectors;

FIG. 8 is a partial detailed view showing the tongue and groove assembly of the cylindrical chamber members;

DESCRIPTION OF THE PREFERRED EMBODIMENT

Figure 9:
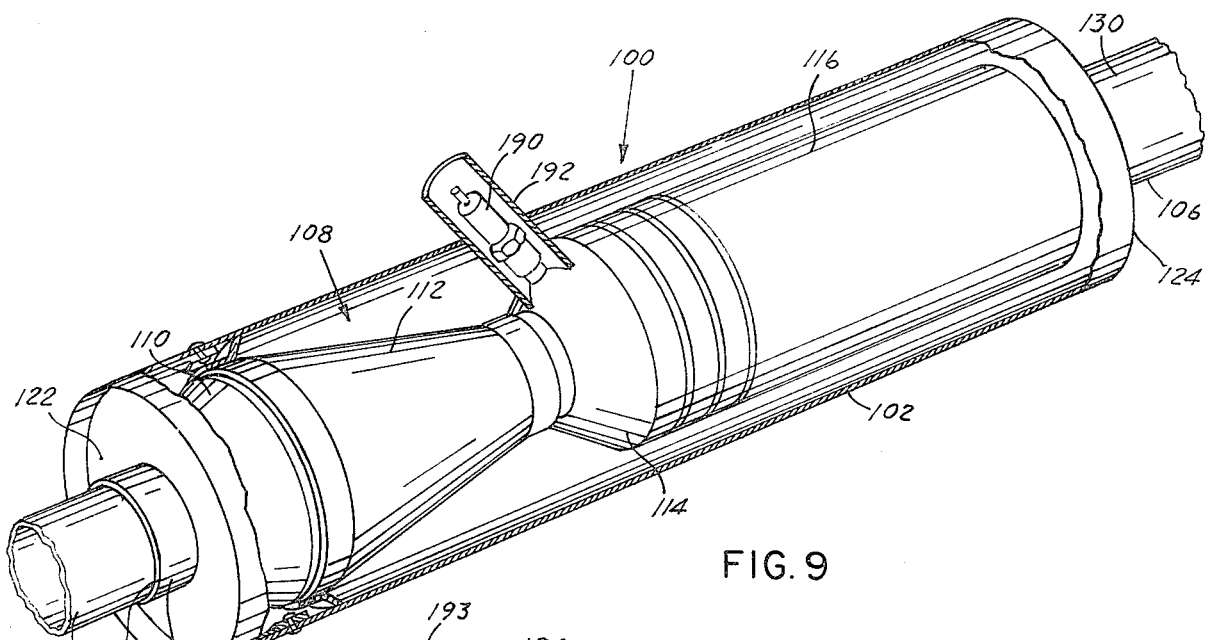
FIG. 9 is a perspective view partly cut away showing another form of an anti-pollution device constructed in accordance with the present invention.

Referring now to the drawings in detail, there is illustrated a preferred form of the anti-pollution device for automotive vehicles and like applications having internal combustion engines constructed in accordance with the principles of the present invention and which is designated generally in its entirety by the reference numeral 10. The anti-pollution device shown in FIGS. 1-8 is comprised of a cylindrical housing 11, a spiral cone 12, an initial ceramic disc 13, a series of subsequent ceramic discs 14, a cooling pipe 15, and associated configurations and interconnecting components as will be later described.

The cylindrical housing 11 consists of two identical semi-circular segments 16 having an outer shell 17 and an inner shell 18 constructed of durable material, such as steel, and as shown in FIG. 8, are separated by insulation material 19, such as sodium, with the inside surface 20 of the inner shell 18 lined with a protective heat conducting material 21, such as porcelain. Each segment 16 is further provided with opposed end surfaces 22 and 23 which are formed by bending the ends of the outer shell 17 inwardly and the ends of the inner shell outwardly and by conjoining both together in a conventional way, such as by welding, and the mating edges 24 and 25. As shown in FIG. 8, the mating edges 24 and 25 are comprised of strips of durable material, such as steel, and are securely affixed such as by welding, so as to span and enclose the outer shell 17 and the inner shell 18 so as to protrude a short distance inwardly to also span the thickness of the lining 21. The mating edge 24 is provided with a tongue 26 along the length of the mating edge 24 and with the mating edge 25 is provided with a groove 27 along its length, with the inside dimensions of the groove 27 being approximately the same as the outside dimensions of the tongue 26 to provide a tongue and groove assembly between the mating edges 24 and 25 to provide a precise fit between two of the identical segments 16. After assembly, the mating edges 24 and 25 are secured to each other in a conventional way, such as by adhesive, welding, or the like. The lining 11 is formed with a groove 28 toward each end of the segment 16, and as shown in FIG. 7 a series of grooves 29 are located along the center of the segments 16. Each of the described grooves 28 and 29 form a complete circular path around the lining 21 and the inside of the segments 16 when two segments 16 are assembled together.

The spiral cone 12 is constructed of durable heat conducting material, such as ceramic, and is conical in configuration having an outside surface 30 and an opposed inside surface 31, a front surface 32 and a rear surface 33, to provide an opening 34 along the length of the inside surface 31 with the opening 34 being much larger in diameter toward the front surface 32 than toward the rear surface 33. The inside surface 31 is further provided with a series of ribs 35 projecting inwardly toward the opening 34 and are spiral in configuration as each rib progresses from the front edge 32 to the rear edge 33.

The initial ceramic disc 13 is fabricated from a single piece of ceramic type material and is cylindrical in shape having an outside surface 36, opposed end surfaces 37 and 37', with a round through hole 38 located centrally and running axially between the end surfaces 37 and 37'. As shown in FIGS. 1 and 4 a series of through slots 39 are projected around the circumference of the end surfaces 37 and 37' so as to extend from the opening 38 to near the outside surface 36 with the width of each slot 39 angularly disposed so as to increase as each slot 39 extends from the opening 38 toward the outside surface 36.

The subsequent ceramic discs 14 are constructed similarly to the initial ceramic disc 13 having an outside surface 40, opposed end surfaces 41 and 41', a round through hole 42 and a series of through slots 43, with the hole 42 being smaller in diameter than the hole 38 in the disc 13 and with the slots 43 consequently being longer in length than the slots 39. Each of the ceramic discs 13 and 14 are coated with a thick layer of porcelain to provide strength and heat retention properties thereto.

The cooling pipe 15 is a length of durable pipe, such as steel, having an outside surface 44, an opposed inside surface 45 which is lined with a thin layer of porcelain 46 to retain heat away from the metal pipe so as to prevent damage thereto, and opposed end surfaces 47 and 47' to form an interior compartment 48 therealong.

For assembly of the anti-pollution device 10 to the exhaust pipe of an automotive vehicle, a conventional type reduction pipe 50 is provided having a conical portion 51 integrally conjoined with a length of pipe 52 with the pipe opening 53 matching the outside diameter of an automotive exhaust pipe and with the outside edge 54 of the conical portion 51 matching the diameter of a groove 28 provided in a segment 16. A flange 55 is also provided and consists of a circular plate 56 having an outisde diameter as shown by the reference numeral 57 equal to the diameter of a groove 28 in a segment 16, the plate 56 being further provided centrally with a round through hole 58 to which is securely affixed, such as by welding, a length of pipe 59 provided with a diameter to match the diameter of an automotive exhaust pipe (not shown).

The anti-pollution device 10 is assembled, as shown in FIG. 1, by first placing the various components into one segment 16. The reduction pipe 50 is first placed into one of the grooves 28 so that the pipe 52 projects outwardly from the end surface 23 of the segment 16, thus forming the intake end of the anti-pollution device 10. The spiral cone 12 is placed inside the segment 16 with its front surface 32 abutting the reduction pipe 50 so that its rear surface 33 is projected inwardly of segment 16, with the outside diameter of the front surface 32 being equal to the inside diameter of the segment 16 formed by the lining 21. An initial ceramic disc 13 is then placed into the appropriate groove 29 so that the end of the spiral cone 12 near the rear surface 33 is positioned inside the round through hole 38 of the disc 13 to form a stable assembly therebetween. Depending upon the size of the automotive engine, two or more subsequent ceramic discs 14 are positioned within a series of grooves 29 on the inside of the segment 16 so as to be positioned inwardly from the initial ceramic disc 13 and so as to be adjacent to but with a gap provided between each of the discs 13 and 14. The flange 55 is placed into the groove 28 on the opposite end of the segment 16 so that the pipe 59 projects outwardly from the segment 16 to form the discharge end of the anti-pollution device 10. The cooling pipe 15, as shown in FIGS. 1 and 2, is then positioned with the end surface 47 being centrally located against the nearest end surface 41' of the nearest disc 14 and with the end surface 47' then being centrally located over the round through hole 58 in the flange 55, the cooling pipe 15 being secured in place in any conventional way, such as by adhesive or the like, this assembly providing free access of exhaust fumes through the opening 53 in the reduction pipe 50, through the opening 34 in the spiral cone 12, through the opening 38 in the initial ceramic disc 13, to the series of openings 42 provided in the series of subsequent ceramic discs 14, through the interior compartment 48 in the cooling pipe 15, and finally out through the round through hole 58 in the pipe 59 provided on the flange 55. The space 60 thereby provided between the outside surface 44 of the cooling pipe 15 and the lining 21 on the inside surface of the segment 16 is then packed with insulation material, such as sodium, to provide sound deadening and additional cooling properties. The assembly of the anti-pollution device 10 is then completed by placing a second segment 16 onto the first segment 16 so that the tongues 26 provided along the mating edge 24 of one segment 16 are meshed into the groove 27 provided on the mating edge 25 of the other segment 16, where the respective mating edges are securely affixed together in a conventional way, such as by adhesive or the like.

In operation, the exhaust tail pipe of an automotive vehicle (not shown) is cut in a conventional way as near the exhaust manifold of the automotive vehicle as possible, with the tailpipe also being cut a distance rearwardly from the exhaust manifold to provide the desired length of opening in the tailpipe to accomodate the length of the anti-pollution device 10. The cut end of the tailpipe nearest the exhaust manifold is connected to the pipe 52 on reduction pipe 50 in a conventional way, such as by welding, interconnecting clamps, or the like, and the cut end of the tailpipe furthermost from the exhaust manifold is connected in the same way to the pipe 59 provided on the flange 55. When the automotive vehicle is running, the exhaust fumes are then discharged from the exhaust manifold into the tailpipe and then into the opening 34 in the spiral cone 12 where the exhaust fumes are first expanded due to the larger size opening near the front surface 32 and are then agitated by means of the ribs 35 through the smaller opening 34 near the rear surface 33, this representing the first stage of the anti-pollution device 10. From the first stage, exhaust fumes are then propelled through the series of discs 13 and 14, and with the discs 13 and 14 being of ceramic porcelain coated material so as to be of a highly heat conducting property, the discs 13 and 14 become extremely hot after an automotive vehicle has run for a short time, so that, as the exhaust fumes are propelled through the series of discs, the foreign or polluted materials remaining in the exhaust fumes after discharge from the exhaust manifold are thereby burned up virtually completely. The slots 39 in the initial ceramic disc 13 and the slots 43 in the subsequent disc 14 provide not only for expansion and contraction of the respective discs 13 and 14, but also for additional surface area for the exhaust fumes to expand into to provide exposure of the exhaust fumes to more heated surface area and to thereby effectively burn up the pollutant materials therein. The ceramic discs 13 and 14 represent the second stage of the anti-pollution device 10 from whence the exhaust fumes are propelled through the third stage, namely through the interior compartment 48 in the cooling pipe 15 where the exhaust fumes are reduced in temperature or cooled for emission through the round through hole 58 in the flange 55 and out the automotive tailpipe into the atmosphere.

Referring now to FIGS. 9 through 15 another thermal reaction type anti-pollution device is shown and generally designated by numeral 100. Anti-pollution device 100 functions in a manner similar to the anti-pollution device 10 previously described in that unburned hydrocarbon (HC) and carbon monoxide (CO) pollutants in the exhaust gases from an internal combustion engine are oxidized by high temperatures within the device into carbon dioxide and water. In general, the anti-pollution device 100 further includes an external source of energy in the form of a heat source and specifically an igniter is utilized to combust the exhaust mixture and additional controlled amounts of air are passed into the reaction chamber to provide additional oxygen for combustion of the pollutants.

Generally stated, the anti-pollution device 100 shown in FIGS. 9 through 15 comprises an elongated cylindrical outer housing 102 having an inlet opening 104 and an outlet opening 106, and a concentric inner conduit 108 in flow communication with the inlet 104 and outlet 106 openings and including in flow series a generally conically shaped, diverging inlet section 110, a generally conically shaped converging section 112, a generally conically shaped diverging combustion section 114, and a cylindrical cooling section 116. The anti-pollution device 100 further broadly has air inlet means 118 for introducing a controlled quantity of air into the inner conduit 108 for supplying oxygen for combusting the pollutants, and heating means 120 for heating the exhaust gas mixture preferably by igniting the gases as the gases flow through the combustion section 114 of the inner conduit 108 for combusting the pollutants.

The outer housing 102 shown is cylindrical in shape and may be fabricated from a length of cylindrical metal tubing. Metal end plates 122 and 124 are affixed to each open end of the housing 102 preferrably by seaming or welding the plates 122 and 124 to the housing to provide a sealed connection. The end plates 122 and 124 each have a flanged concentric opening 126 and 128, respectively, which permits the housing to be coupled in line with the exhaust pipe 130 of the internal combustion engine to be treated. The exhaust pipe 130 is affixed to the flanged openings 126 and 128 preferrably by welding to provide a sealed connection.

Figure 11:
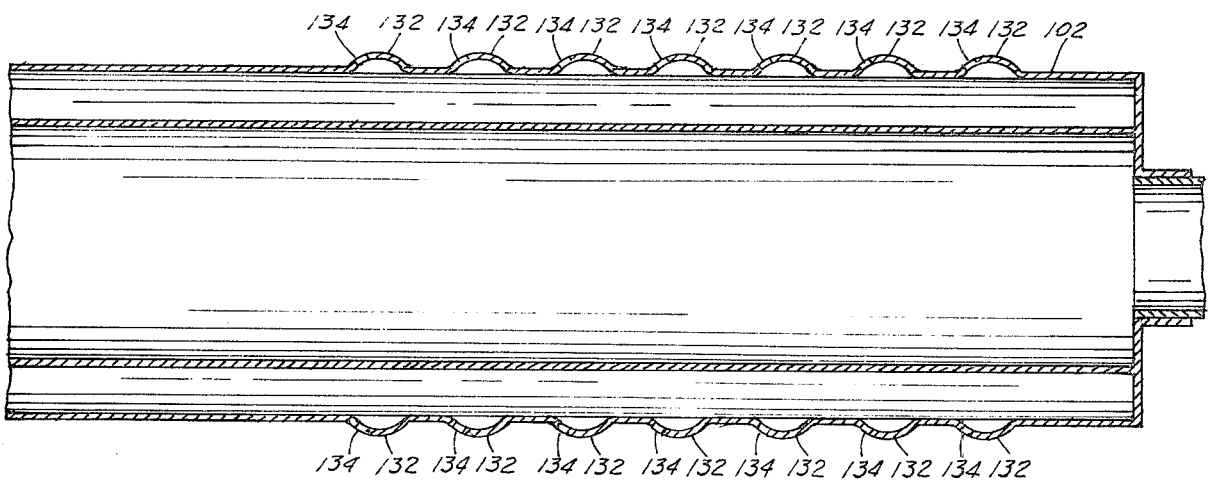
FIG. 11 is a cross-sectional view of a downstream portion of the anti-pollution device of FIG. 10.

The downstream end portion of the outer housing 102 circumjacent to the cooling pipe 116 of the inner conduit 108 has an outer surface which as shown in FIG. 11 is formed with a plurality of radiused dimples 132 each having a small through orifice 134. These orificed dimples preferably are arranged in line at equal intervals and at circumferentially spaced intervals. The dimples 132 and orifices 134 function to dissipate heat from the cooling pipe 116 and outer housing 102 by providing a passage for airflow around the cooling pipe 116 and a larger surface area for heat dissipation from the outer housing 102.

Figure 10:
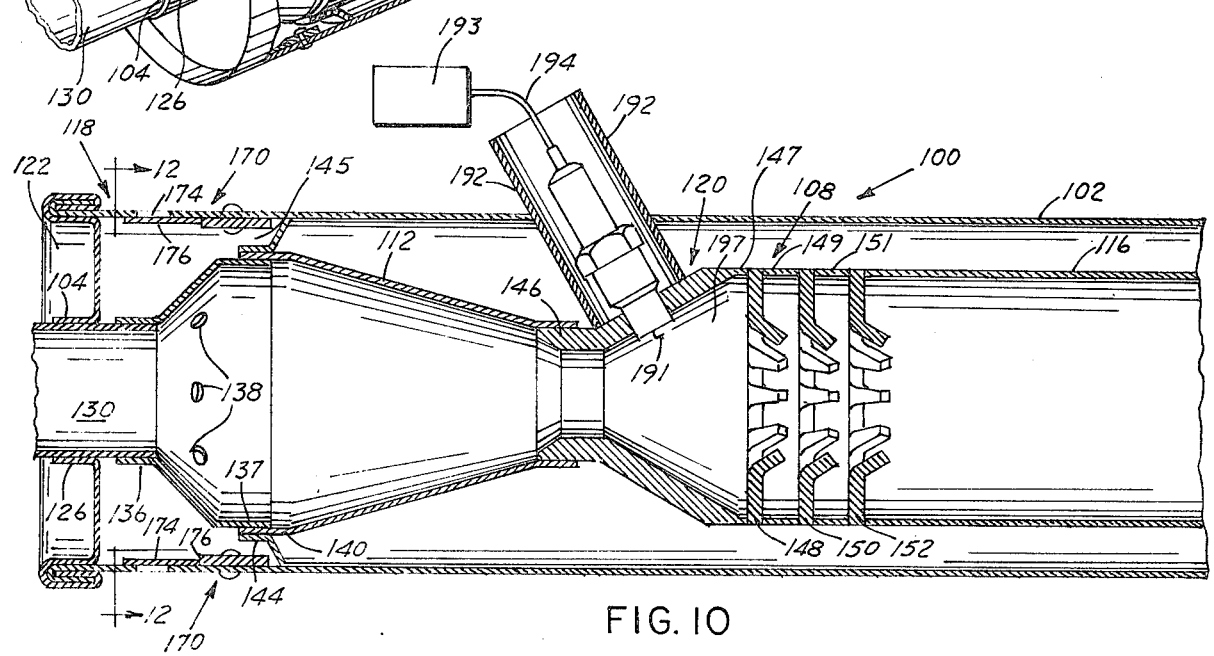
FIG. 10 is a cross-sectional view of an upstream portion of the anti-pollution device of FIG. 9.

Referring now to FIG. 10 the inner conduit 108 is shown. Diverging inlet section 110 of the inner conduit 108 is located adjacent to the inlet opening 104 of the housing and is coupled to the exhaust pipe 130 of the internal combustion engine in flow communication therewith. The diverging inlet section 110 has a generally conical peripheral configuration with a generally conical interior surface that diverges in the direction of gas flow toward the downstream end and away from the central longitudinal axis of the inner conduit. A flanged inlet opening 136 is provided on the inlet section 110 and is affixed to the exhaust pipe 130 preferrably by welding to provide a sealed connection. A flanged generally cylindrical outlet portion 137 of greater cross section than the inlet portion 136 is provided on the inlet section for affixing the inlet section to converging section 112 of the inner conduit at a sealed connection. In addition a plurality of circumferentially spaced through orifices 138 are provided along the outer periphery of the inlet section 110 which as will hereinafter be explained allow air to be drawn into the inner conduit 108 for supporting combustion of the pollutants in the exhaust gas.

Converging section 112 of the inner conduit 108 is located downstream from inlet section 110 in flow series therewith. Converging section 112 also has a generally conical peripheral configuration with a generally conical interior surface that converges in the direction of gas flow towards the longitudinal axis of the inner conduit 108. A flanged generally cylindrical inlet portion 140 is provided for affixing the converging section 112 to inlet section 110 at a sealed connection and a flanged, generally cylindrical outlet portion 142 of a lesser cross section than the inlet portion 140 is provided for affixing the converging section 110 to combustion section 114 of the inner conduit at a sealed connection. The converging section 112 is attached to an annular bracket 144 which is attached to the inner walls of the outer housing 102 and supports the inner conduit 108 within the outer housing 102. The annular bracket 144 forms an enclosed annular space 145 in the interior of the outer housing 107 where as will hereinafter be explained air is admitted for passage into the inlet section 110.

The combustion section 114 has a generally conical peripheral configuration with a generally conical interior surface that diverges in the direction of gas flow away from the longitudinal axis of the conduit 108 providing a Venturi tube so that a gas flowing therethrough creates a differential pressure which will cause the valves hereinafter described to open and external air to flow into conduit 108 via openings 138. The combustion section is provided with a flanged, generally cylindrical inlet portion 146 for attaching the combustion section to converging section 112 and an outlet portion 147 of a greater cross section than the inlet portion 146.

The cooling section 116 is a length of cylindrical metal pipe or tubing that is coupled at its inlet end to combustion section 114 and at its outlet end to the exhaust conduit 130 of the internal combustion engine. Three parallel, axially spaced, metallic baffle plates 148, 150, and 152 are mounted downstream from the combustion section 114 between the combustion section and the cooling section 116 in close proximity to the outlet of the combustion section 114. Baffle plates 148 and 152 preferably are welded to the combustion section 114 and cooling section 116, respectively, and baffle plate 150 preferably is welded to two annular spacer elements 149 and 151 welded to the combustion section 114 and cooling 116 section.

Figure 14:
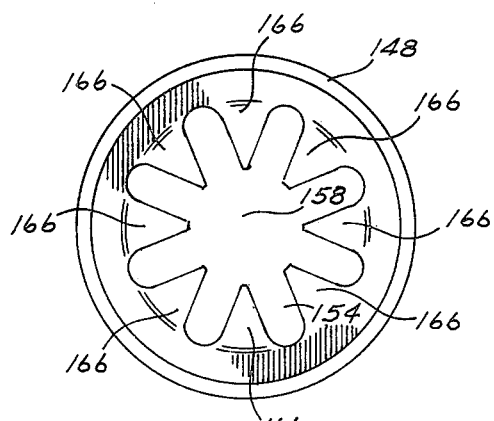
FIG. 14 is a detail plan view of a baffle plate for the anti-pollution device of FIG. 9.
Figure 15:
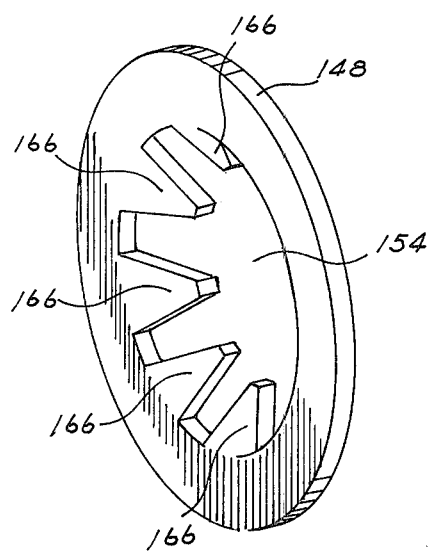
FIG. 15 is a detail perspective view of the baffle plate of FIG. 14.

Referring now to FIGS. 14 and 15 the baffle plates preferably are fabricated from a corrosion and heat resistant metal such as stainless steel. Each plate is identical in construction and with specific reference to plate 148 each has a circular outer peripheral configuration and a cut out middle portion 154. The cut out middle portion 154 of the plates has an irregular peripheral configuration with a generally circular center portion 158 and eight through slots 156 spaced around the periphery of the center portion 158 extending radially out from the center portion 158. As shown in FIGS. 10 and 15 the plate wall portion between adjacent slots 56 are bent axially away from the plane of the front and rear surfaces of the plates. These bent wall portions are designated 156. The baffle plates 148, 150 and 152 are mounted in the cooling section 116 of the inner conduit 108 such that the bent wall portions 156 are bent away from the plates in the direction of flow of the exhaust gases. In the arrangement each successive baffle plate has the slots non-alined whereby gases passing therethrough are diverted. As will hereinafter be explained the irregular cut out opening 158 and bent wall portion 156 of the baffle plates 148, 150 and 152 function to induce flow of the exhaust gases and increase the retention time of the gases in the combustion section 114.

Figure 12:
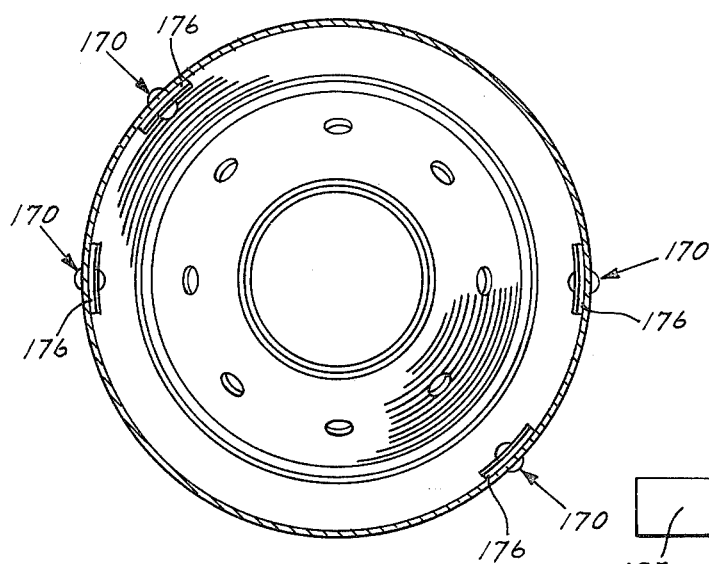
FIG. 12 is an end view partly cut away of FIG. 10.

Referring again to FIG. 10 the flow controlled air inlet portion 118 shown generally includes four check valves 170 extending at spaced intervals around the periphery of the outer housing 102, the isolated annular space 145 and the plurality of through orifices 138 above described. As shown in FIGS. 10 and 12 each check valve 170 comprises a through orifice 174 in the outer housing 102 and a reed or resilient flap 176 fastened to the inner wall of the outer housing 110. The resilient flaps 176 are shown riveted to the inner surface of the outer housing 102 and in covering relation to the orifices 174. This arrangement is such that a negative pressure within annular space 145 caused by gas flow through Venturi tube section 114 of the inner conduit 108 causes the flaps 176 to swing away from orifices 174 and admit controlled amounts of air into the annular space 145. The flaps 176 are generally arcuate and sized and shaped to the contour of the inner surface of housing 110. Because the flaps are hinged to the inside wall of the outer housing 102 however, airflow in the opposite direction from the annular space 145 to the atmosphere is not permitted. The number of check valves 170 and diameter of the check valve orifices 176 may be varied as required to admit an optimum quantity of air into the exhaust gases to support combustion. The quantity of air admitted must be precisely controlled by the valves 170 because too much air tends to cool the exhaust gases and inhibit combustion whereas too little air does not provide enough oxygen to support the combustion. This arrangement of the check valves and the location thereof distant from combustion section 114 controls the burn and prevents ignited gases from escaping to the atmosphere.

Annular space 145 is isolated from the remainder of the interior of the outer housing 102 by the annular bracket 144. Air within annular space 145 can thus be directed from the annular space 145 through orifices 138 in the inlet section 110 of the inner conduit 108 into the interior of the inner conduit.

Figure 13:
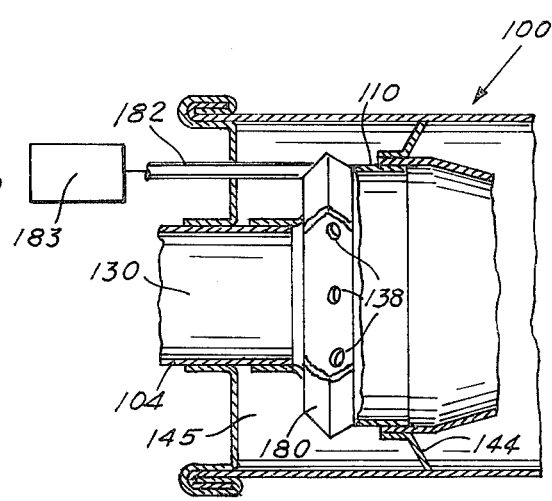
FIG. 13 is a sectional view partially cut away of a modified form of FIG. 9 with an air injection arrangement.

An arrangement for injecting air under a position pressure into the inside of the inner conduit 108 is shown in FIG. 13. In this arrangement an enclosed manifold 180 is affixed to the exterior surface of the inlet section 110 of the inner conduit 108 circumjacent to the orifices 138 in the inlet section 110 at a sealed connection. An air inlet tube 182 is coupled to the manifold 180 for supplying air under a positive pressure to the manifold 180. The air inlet tube 180 is shown coupled to a source of air under pressure such as an air compressor represented at 183 for pumping a selected quantity of air into the manifold. The necessary selected quantity of air can thus be forced into the inner conduit 108 as required for supporting combustion of the pollutants.

Referring again to FIG. 10 the external energy source 120 includes spark plug 190 mounted to a threaded hole in the Venturi tube combustion section 114. The electrode 191 of the spark plug 190 is located within the interior of the combustion section. The spark plug is ignited by a coil on the vehicle or a little electric power source represented at 193 via an ignition wire 194. For protecting the spark plug 190 a cylindrical shroud 192 is sealingly affixed to the outer housing 102 and the combustion section 114 and the spark plug is situated within the shroud 192. The firing of the spark plug ignites the exhaust gases in the combustion section 114 and at the same time produces heat to heat the gases in section 114. The spark plug 190 may be fired periodically by conventional means to maintain an exhaust gas temperature on the order of 2000° F. for combusting the pollutants in the exhaust gases. Alternately a grid that produces a flow such as those used in diesel engines may be utilized to ignite the exhaust gases and maintain combustion temperatures at the desired level within the combustion section 114.

In operation, the anti-pollution device 100 is coupled to the exhaust pipe 130 of the internal combustion engine in close proximity to the exhaust manifold of the engine. The exhaust gases are thus directed into inner conduit 108 of the anti-pollution device 110. As the exhaust gas flow through inlet section 110 of the inner conduit 108 the gases mix with a quantity of air which is injected into the inner conduit 108 through the orifices 138 in the conduit. While passing through the inlet section 110 the gases are expanded by the outwardly diverging interior surface of the inlet section. This expansion aids the mixing of the exhaust gases with the incoming air. From the inlet section 110 the gases are directed through converging section 112. The converging interior surface of converging section 112 compresses the gases and thus raises the temperature of the exhaust gases. The gases then flow into the combustion section 114 where the spark plug 190 which is preferably ignited periodically ignites and heats the air and gas mixture and burns the hydrocarbon and carbon monoxide in the exhaust gases. In addition while passing through the combustion chamber the gases are once again expanded by the diverging combustion chamber. This expansion aids in the combustion of the gases. After passing through the combustion section 114 the gases pass through the baffle plates 148, 150, and 152. The irregular cut out opening 154 and axially bent wall portions 166 of the baffle plates induce a turbulent flow in the gas stream and increase the retention time of the exhaust gases through the combustion section 114 and help provide more time for a complete combustion of the pollutants.

After passing through the baffle plates 148, 150, and 152 the exhaust gases flow into the cooling pipe 116. The cooling pipe 116 is cooled by air flow in the annular area between the cooling pipe 116 and the outer housing 102 so that heat can be continuously removed from the existing exhaust gases. From the cooling pipe 116 the exhaust gases flow into exit portion of the exhaust pipe 130 and are vented to the atmosphere.

There is thus described an anti-pollution device for use on automotive vehicles which meets all of its stated objectives and which overcomes the disadvantages of existing more costly and less effective techniques.

Although the present invention has been described with a certain degree of particularity, it is understood that the present disclosure has been made by way of example and that changes in details of structure may be made without departing from the spirit thereof.

What is claimed is:

1. An anti-pollution device for treatment of the exhaust gases of an internal combustion engine powered vehicle comprising an elongated housing, an exhaust gas intake element at a first inlet end of said housing adapted for connection to the exhaust manifold of said internal combustion engine whereby exhaust gases are delivered to the interior of said housing, an exhaust gas discharge element having an outlet at the opposite end of said housing, means dividing the interior of said housing into a plurality of separate flow interconnected exhaust gas treatment stages, a first stage providing a converging cone structure having an outlet end of lesser cross section than an inlet end whereby the exhaust gases are accelerated as they are delivered to a downstream intermediate stage, a plurality of longitudinally spaced apart ceramic disc gas flow diverter elements disposed at and defining said intermediate stage with each of said disc diverter elements providing a central opening with slots through said disc extending radially therefrom for the passage and expansive flow of said exhaust gases, and a downstream cooling stage for the reception and cooling of exhaust gases that have passed said intermediate stage, said cooling stage including a flow pipe disposed within said elongated housing and spaced from a wall portion thereto to provide a chamber intermediate said cooling pipe and said housing wall portion, said discharge element being interconnected with said flow pipe of said cooling stage whereby the treated exhaust gases are released through said outlet.

2. An anti-pollution device as set forth in claim 1 wherein said radially extending slots of successive disc diverter elements are in non-alined positions whereby gases passing through successive diverter elements are caused to move in a non-linear flow pattern.

3. An anti-pollution device as set forth in claim 2 wherein said radially extending slots of said disc diverter elements are of expanding width away from said central opening whereby the gases will be expanded as they move radially and outwardly along said slots.

4. An anti-pollution device as set forth in claim 1 and further including an insulation material disposed in said chamber intermediate said cooling pipe and housing wall portion.

5. An anti-pollution device as set forth in claim 1 and further including a plurality of ribs disposed on an inner surface of said converging cone structure and exposed to introduce rotary movement to said incoming gases as they are accelerated through said first stage.

6. An anti-pollution device as set forth in claim 1 and further including paired semi-circular segments defining said cylindrical housing wherein each segment includes an outer shell and an inner shell separated one from the other, a coating of protective and heat-conductive material disposed on an inside surface of said inner shell, and insulation material between said inner and outer shells.

7. An anti-pollution device as set forth in claim 6 wherein said semi-circular segments are of identical construction with each of said segments having cooperatively mating tongue-and-groove type edges to assure improved alinement and gas-tight assembly for said housing.

8. An anti-pollution device as set forth in claim 6 wherein the lined inside surface of said inner shell segments have a series of longitudinally spaced grooves on the inner surface of said segments to provide a series of circular grooves when two segments are mated together.

9. An anti-pollution device as set forth in claim 8 wherein said converging cone structure and disc diverter elements are secured in position in said grooves when said housing is assembled.

10. An anti-pollution device for treatment of the exhaust gases of an internal combustion engine comprising:

an elongated outer housing having an inlet and an outlet;

an inner conduit mounted within the interior of said housing adapted for mounting in flow communication with an exhaust conduit of an internal combustion engine and including in flow series a generally conically shaped diverging inlet section having an outlet end of greater cross section than an inlet end, a generally conically shaped converging section having an outlet end of lesser cross section than an inlet end, a combustion section and a cooling section;

heating means for adding heat to the exhaust gases as said gases pass through said combustion section whereby pollutants in the exhaust gases are oxidized; and inlet means for passing controlled amounts of air into said inner conduit via said inlet section for providing additional oxygen for supporting the combustion of said pollutants.

11. An anti-pollution device as defined in claim 10 wherein said combustion section is in the form of a Venturi tube having a generally conical shape with an inlet end of a lesser cross section than an associated outlet end.

12. An anti-pollution device as defined in claim 10 further including a plurality of parallel, axially spaced baffle plates mounted downstream from said combustion section between said combustion section and said cooling section.

13. An anti-pollution device as defined in claim 10 wherein said heating means includes an igniter for igniting the exhaust gases passing through said combustion section.

14. The anti-pollution device as defined in claim 13 wherein said igniter is a spark plug.

15. An anti-pollution device as defined in claim 10 wherein said inlet means includes:
a plurality of orifices arranged at circumferentially spaced intervals along the outer periphery of said inlet section for admitting air from the interior of said outer housing and into the interior of said inlet section for mixing with the exhaust gases therein; and
a plurality of check valves for admitting controlled amounts of air from the atmosphere into the interior of said outer housing.

16. An anti-pollution device as defined in claim 10 wherein said inlet means includes:
a plurality of orifices arranged at spaced intervals along the outer periphery of said inlet section for admitting air into the interior of said inlet section for mixing with the exhaust gases;
an enclosed manifold in communication with said orifices; and
means for injecting air under pressure into said manifold.

17. An anti-pollution device as defined in claim 10 wherein said outer housing has a dimpled outer surface with a plurality of through orifices for circulating air around said cooling section.

18. An anti-pollution device for treatment of the exhaust gases of an internal combustion engine comprising:
an enclosed elongated outer housing having an inlet and an outlet;
an inner conduit mounted within the interior of said outer housing and including in flow series a generally conically shaped diverging inlet section adapted for connection to an exhaust conduit of said internal combustion engine and having an inlet portion of a lesser cross section than an outlet portion, a generally conically shaped converging section coupled to said inlet section and having an inlet portion of a greater cross section than an outlet portion, a generally conically shaped diverging Venturi tube combustion section coupled to said inlet section and having an inlet portion of a lesser cross section than an outlet portion, and a cooling section coupled to said combustion section;
a plurality of baffle plates mounted downstream from said combustion section;
means for igniting the exhaust gases as the gases pass through said combustion section heat the exhaust gases to a temperature sufficient to oxidized the pollutants in the exhaust gases;
inlet means for passing controlled amounts of air into said inlet section for providing oxygen for oxidation of the pollutants in response to gases flowing through said combustion section causing a reduced pressure therein; and
means for cooling said cooling section.

19. An anti-pollution device as defined in claim 18 wherein said igniting means includes an igniter mounted to said combustion section such that a spark from periodically firing said igniter heats the exhaust gases passing through said combustion and oxidizes the pollutants in the exhaust gases.

20. An anti-pollution device as defined in claim 18 wherein said inlet means includes:
an annular area formed between said outer housing and said inlet section isolated from the remainder of the interior of said outer housing;
a plurality of orifices along the outer periphery of said inlet section for admitting air from said annular area into the interior of said inlet section for mixing with the exhaust gases; and
a plurality of check valves for admitting air from the atmosphere through said outer housing into said annular area.

21. An anti-pollution device as defined in claim 18 wherein said inlet means comprises:
a plurality of orifices arranged at spaced intervals along the outer periphery of said inlet section for admitting air into the interior of said inlet section for mixing with the exhaust gases;
an enclosed manifold in communication with said orifices; and
means for injecting air under pressure into said manifold.

22. An anti-pollution device as defined in claim 18 wherein said cooling means comprises a plurality of orifices through said outer housing for circulating air around said cooling section.

23. An anti-pollution device as defined in claim 18 wherein said outer housing has a dimpled outer surface for increasing surface area for heat dissipation.

* * * * *